Patented Nov. 2, 1937

2,098,203

UNITED STATES PATENT OFFICE 2,098,203

AROMATIC POLYETHER CHLORIDE

Herman A. Bruson, Philadelphia, Pa., assignor to Röhm & Haas Company, Philadelphia, Pa.

No Drawing. Application February 24, 1937, Serial No. 127,409

5 Claims. (Cl. 260—150)

This invention relates to β-chlor-alkoxyalkyl ethers of monohydric phenols containing as a nuclear substituent an aliphatic hydrocarbon radical having at least eight carbon atoms, said ethers being new compounds useful as intermediates for the preparation of detergents and emulsifying agents.

In co-pending applications, Serial No. 82,184, filed May 28, 1936, and No. 86,344, filed June 20, 1936, by H. A. Bruson some of these compounds are described.

It is known that sodium phenate will condense with β,β'-dichlorodiethyl ether to yield β-phenoxy-β'-chlorodiethyl ether. (Jour. American Chem. Soc. 47, 1174 (1925)). It is also known that cresol and xylenol behave in the same way. (U. S. Patent No. 1,943,972.) The products thus far produced do not, however, display any appreciable degree of detergency when converted into water-soluble derivatives.

A study of the influence of various radicals on the properties of compounds of the above type has shown that the presence of an aliphatic radical of at least eight carbon atoms, attached to the phenyl nucleus, is necessary for marked cleansing activity to appear in the water-soluble derivatives such as those derived by sulfonation of the benzene ring or by replacement of the terminal chlorine atom by a hydrophilic group.

The object of this invention is to provide these new compounds as intermediates for this purpose by a simple method capable of producing high yields of the desired substance.

This is accomplished in the following manner: One mol. equivalent of a monohydric phenol, having as a nuclear substituent an aliphatic hydrocarbon radical of from eight to eighteen carbon atoms inclusive, is mixed with an excess of β,β'-dichloro-dialkylether, preferably 3 to 4 mol. equivalents, and from 1 to 1.5 mol. equivalents of an alkali metal hydroxide (NaOH or KOH) in the form of a concentrated aqueous solution. This mixture is heated slowly under a reflux condenser to about 95° C. with rapid and efficient stirring, and held thereat until foaming ceases (two to three hours). The temperature is then raised to 110° to 115° C. and held thereat for eight to twelve hours, depending upon the size of the batch, while stirring constantly. The water is then distilled off and the alkali metal chloride (NaCl or KCl) removed by filtration or by washing with water. The oil obtained is fractionally distilled to recover unchanged dichlorodialkyl ether, and the residual oil is then distilled under reduced pressure to obtain the desired compound. Yields of product as high as 96% of theory are obtained.

The reaction is applicable to those dichlorodialkyl ethers which have two carbon atoms between the chlorine and oxygen atoms; i. e., which have the structure

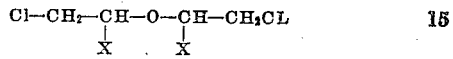

where X is a hydrogen atom or an alkyl group such as methyl, ethyl, propyl, butyl, amyl, or higher alkyl group.

The phenols which are used contain only one phenolic hydroxyl groups, and at least one nuclear aliphatic hydrocarbon substituent of at least eight carbon atoms. Typical of these are the octyl-, decyl-, dodecyl-, hexadecyl-, oleyl-, or octadecyl-phenols, in which the alkyl group is either straight or branched in character.

The presence of an additional neutral substituent, such as a chloro, nitro, alkoxy, etc. group in the aromatic nucleus of the above phenols is not harmful to the utility of the products obtained; consequently, the phenols employed may contain such inert groups in addition to the aliphatic hydrocarbon radical of from eight through eighteen carbon atoms. Furthermore, the cresols or xylenols corresponding to any of the above phenols can be used.

The following examples illustrate this invention:

*Example 1*

A mixture consisting of 130 g. of p-α,α,γ,γ-tetramethylbutylphenol, 342 g. of β,β'-dichlorodiisopropyl ether, 24 g. of NaOH, and 100 cc. of water was heated under reflux at 110° C. for six hours, with rapid stirring. The product was washed with warm water and the oil layer fractionally distilled under reduced pressure. The β-p-ter-octylphenoxy-β'-chlorodiisopropyl ether distilled at 178° to 190° C./4 mm. as a colorless oil.

Example 2

A mixture consisting of 618 g. of p-α,α,γ,γ-tetramethylbutylphenol, 141 g. of NaOH, 200 g. of water, and 1704 g. of β,β'-dichlorodiethyl ether was boiled under reflux at 110° to 115° C. for eight hours with rapid stirring. The water was then distilled off, the residual sodium chloride filtered by suction, and the clear filtrate distilled in vacuo. The β-p-α,α,γ,γ-tetramethylbutylphenoxy-β'-chlorodiethyl ether came over as a pale yellow oil boiling at 177° to 178° C./4 mm. On cooling, it solidified to a crystalline mass. M. P. 27° to 28° C. after recrystallization from petroleum ether. The yield is 90 to 95% of theory.

Example 3

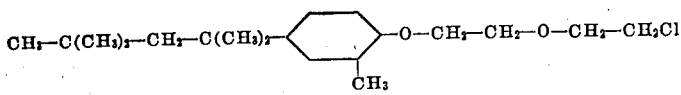

A mixture consisting of 220 g. of o-methyl-p-α,α,γ,γ-tetramethylbutylphenol (made by condensing o-cresol with diisobutylene and concentrated sulfuric acid), 572 g. of β,β'-dichlorodiethyl ether, 46.8 g. of NaOH, and 50 cc. of water was heated seven hours at 110° to 115° C. with thorough agitation under reflux, and worked up as described in Example 2. The β-(o-methyl-p-α,α,γ,γ - tetramethylbutylphenoxy) - β'-chlorodiethyl ether distilled at 184° to 191° C./2 mm. It was a colorless oil and the yield was 96% of theory.

Example 4

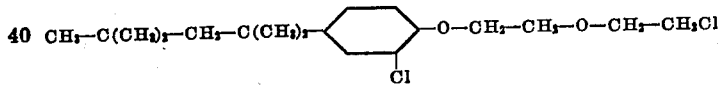

A mixture consisting of 118 g. of o-chloro-p-α,α,γ,γ-tetramethylbutylphenol, 286 g. of β,β'-dichlorodiethyl ether, 23 g. of NaOH and 50 cc. of water was boiled seven hours at 110° to 115° C. under reflux, with constant stirring. The water was distilled off, the residual oil filtered, and the filtrate fractionated in vacuo. The o-chloro-p-α,α,γ,γ - tetramethylbutyl phenoxyethoxyethyl chloride distilled over at 187° to 191° C./2 mm. It was a colorless oil and the yield was 86% of theory.

Example 5

β - caprylphenoxy - β'-chlorodiethyl ether.—A mixture of 65 g. of sec-octylborate (tricapryl borate) and 94 g. of phenol, containing 5.6 g. of boron trifluoride dissolved therein, was heated with agitation under a reflux condenser to 147° C. in 20 minutes. The boron fluoride was evolved, leaving a mixture of caprylphenol and boric acid. The crude product was washed several times with water and fractionated in vacuo. Caprylphenol is a colorless, odorless oil boiling at 129° to 132° C./2 mm. The yield was 67 g. or 56% of theory. It is probably the orthocaprylphenol.

A mixture consisting of 103 g. of the above caprylphenol, 286 g. of β,β'-dichlorodiethyl ether, 23.4 g. of NaOH and 25 cc. of water was heated at 110° to 115° C. for six hours with constant stirring under a reflux condenser. The water was then distilled off, the liquid filtered to remove NaCl, and the filtrate fractionated in vacuo. The β-caprylphenoxy-β'-chlorodiethyl ether distilled over as a colorless oil at 189° to 194° C./5 mm. The yield was 82% of theory.

Example 6

β - laurylphenoxy - β'-chlorodiethyl ether.—A mixture of 200 g. of lauryl alcohol (B. P. 127° to 133° C./7 mm.), 200 g. of phenol, and 200 g. of anhydrous powdered zinc chloride was boiled eighteen hours under reflux, with good agitation, at 180° to 185° C. The reaction product was washed with warm water and fractionated in vacuo. The laurylphenol fraction boiled at 170° to 200° C./9 mm., and consisted of a mixture of isomeric dodecylphenols and laurylphenyl ether. This material was condensed as follows to laurylphenoxyethoxyethyl chloride.

96 g. of the above laurylphenol fraction, 210 g. of β,β'-dichlorodiethyl ether, 17.3 g. of NaOH, and 25 cc. of water was boiled under reflux, with rapid agitation, at 110° to 115° C. for seven hours. The water was then distilled off, the sodium chloride removed from the residual oil by filtration, and the oil distilled in vacuo. Unchanged laurylphenylether was recovered. The fraction boiling at 200° to 230° C./4 mm. was collected as laurylphenoxyethoxyethyl chloride. It formed a colorless oil. Analysis for chlorine showed it to be better than 90% pure.

Example 7

β-cetylphenoxy-β'-chlorodiethyl ether.—A mixture of 130 g. of cetylphenol (B.P. 200° to 220° C./2 mm.), as made by heating equal weights of technical cetyl alcohol, phenol, and anhydrous ZnCl₂ at 185° C. for eighteen hours under reflux, 220 g. of β,β'-dichlorodiethyl ether, 18.6 g. of NaOH, and 30 cc. of water was boiled seven hours, with stirring under reflux, at 110° to 112° C., and worked up as in Example 6. The β-cetylphenoxy-β'-chlorodiethyl ether distilled over at 240° to 270° C./4 mm. as a colorless oil which solidified to a waxy mass on cooling.

Example 8

β-stearylphenoxy-β'-chlorodiethyl ether.—A mixture consisting of 104 g. of stearylphenol (B. P. 200° to 225° C./2 mm., prepared as in Example 10, from n-octadecanol-1, ZnCl₂ and phenol), 172 g. of β,β'-dichlorodiethyl ether, 14 g. of NaOH and 20 cc. of water was heated with stirring at 110° to 115° C., under reflux, for eight hours, and worked up as in Example 9. The fraction containing β-octadecylphenoxy-β'-chlorodiethyl ether distilled at 240° to 250° C./1 mm. as an oil which became waxy in the cold.

Example 9

In the manufacture of synthetic methanol by the action of hydrogen on carbon monoxide at high pressures in the presence of catalysts, there are obtained higher aliphatic primary and secondary alcohols having branched chains. A fraction of such alcohols boiling at 160° to 200° C. contains branched chain primary and secondary octyl-, nonyl-, decyl-, undecyl-, and possibly higher alcohols. Such a fraction was condensed at 185° C. with an equal weight of phenol and anhydrous zinc chloride for eighteen hours. The product, after washing and fractionation in vacuo, formed a colorless oil boiling at 140° to 180° C./11 mm. It consisted essentially of branched chain octyl-, nonyl-, decyl-, and undecylphenols, together with some of the corresponding ethers. A mixture of 103 g. of the above mixed alkylphenols, 286 g. of $\beta,\beta'$-dichlorodiethyl ether, 23.4 g. of NaOH, and 25 cc. of water was boiled under reflux for eight hours with constant stirring at 110° to 115° C. The product was washed with warm water and the oil fractionally distilled in vacuo. The fraction boiling at 170° to 210° C./.4 mm. was collected. It was a colorless oil and contained 10.6% chlorine by analysis.

Example 10

$\beta$ - undecylphenoxy-$\beta'$ - chlorodiethyl ether.—A mixture consisting of 124 g. of 5-ethyl-nonanol-2, 124 g. of anhydrous zinc chloride and 124 g. of phenol was stirred and boiled under reflux for eighteen hours at 180° C. The product was washed with hot water and distilled in vacuo yielding 100 g. of an undecylphenol as a colorless oil, boiling at 146° to 156° C./2 mm.

A mixture consisting of 82 g. of the above undecylphenol, 189 g. $\beta,\beta'$-dichlorodiethyl ether, 15.4 g. of sodium hydroxide and 25 cc. of water was stirred and boiled under reflux for eight hours at 110° to 112° C. The water was then distilled off, the oil filtered and the filtrate distilled in vacuo. The product was a colorless liquid boiling at 180° to 220° C./5 mm. The yield equals 80% of theory.

I claim:

1. $\beta$-(p-$\alpha,\alpha,\gamma,\gamma$-tetramethylbutylphenoxy)-$\beta'$-chlorodiethyl ether.
2. $\beta$-laurylphenoxy-$\beta'$-chloroethyl ether.
3. $\beta$-cetylphenoxy-$\beta'$-chlorodiethyl ether.
4. A $\beta$-alkylphenoxy-$\beta'$-chlorodiethyl ether in which the alkyl group contains from eight to eighteen carbon atoms inclusive.
5. A compound of the general formula

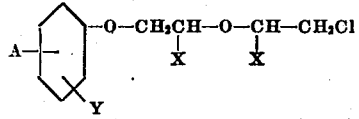

in which A is an alkyl radical containing from eight to eighteen carbon atoms inclusive, X is a member of the group consisting of hydrogen atoms and alkyl groups containing from one to five carbon atoms and Y is a member of the group consisting of a hydrogen atom and alkyl and alkoxy groups.

HERMAN A. BRUSON.